(12) United States Patent
Garman (10) Patent No.: US 8,590,445 B2
(45) Date of Patent: *Nov. 26, 2013

(54) HOT BEVERAGE MAKER WITH CUP-ACTUATED DISPENSER

(75) Inventor: Michael Howard Garman, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 139 days.

This patent is subject to a terminal disclaimer.

(21) Appl. No.: 13/190,545

(22) Filed: Jul. 26, 2011

(65) Prior Publication Data

US 2011/0284574 A1    Nov. 24, 2011

Related U.S. Application Data

(63) Continuation of application No. 11/466,868, filed on Aug. 24, 2006, now abandoned, which is a continuation-in-part of application No. 10/838,307, filed on May 4, 2004, now Pat. No. 7,543,528, which is a continuation of application No. 10/720,769, filed on Nov. 24, 2003, now Pat. No. 7,461,586, which is a continuation-in-part of application No. 10/403,438, filed on Mar. 31, 2003, now Pat. No. 6,681,960, which is a continuation of application No. 10/011,759, filed on Dec. 11, 2001, now Pat. No. 6,564,975.

(51) Int. Cl.
  *A47J 31/24*   (2006.01)
  *A47J 31/00*   (2006.01)

(52) U.S. Cl.
  USPC ......... 99/307; 99/279; 99/323.3; 222/189.06; 222/146.5

(58) Field of Classification Search
  USPC ............. 99/306, 307, 275, 279, 290, 323.3; 222/189.11, 189.06, 146.5; 426/433
  See application file for complete search history.

(56) References Cited

U.S. PATENT DOCUMENTS

| | | |
|---|---|---|
| 1,572,221 A | 2/1926 | Peterson |
| 3,934,757 A | 1/1976 | Malek |
| 4,069,750 A | 1/1978 | Kemp |
| 4,100,394 A | 7/1978 | Tilip |
| 4,141,286 A | 2/1979 | Smit |
| D261,657 S | 11/1981 | Villa |
| 4,309,939 A | 1/1982 | Stover |
| 4,360,128 A | 11/1982 | Neumann |
| 4,532,142 A | 7/1985 | Dean |
| 4,572,060 A | 2/1986 | Yung-Kkuan |
| 4,610,145 A | 9/1986 | Arzberger et al. |
| 4,624,177 A | 11/1986 | Ito et al. |
| 4,706,555 A | 11/1987 | Nakamura et al. |
| 4,748,901 A | 6/1988 | Burmeisier |
| 4,749,107 A | 6/1988 | Stover |
| 4,770,090 A | 9/1988 | Woon et al. |
| 4,800,935 A | 1/1989 | Buchser et al. |

(Continued)

*Primary Examiner* — Reginald L Alexander
(74) *Attorney, Agent, or Firm* — Alexander D. Raring (57) ABSTRACT

A hot beverage maker has a stand, fresh water reservoir, a removable tank, and a spring-biased actuator means for dispensing brewed beverages. The tank includes a reservoir portion and the reservoir portion is adapted to hold a brewed liquid so that the tank comprises a fluid bucket when removed from the hot beverage maker. The tank is placed on a platform in a mating relationship so as to engage a warmer plate to keep the contents of the tank warm. The hot beverage maker produces a brewed beverage that is stored in the tank. The dispenser actuator may be engaged by a vessel for holding a hot beverage in order to commence the dispensing of the brewed beverage from the tank.

11 Claims, 7 Drawing Sheets

(56) References Cited

U.S. PATENT DOCUMENTS

| | | |
|---|---|---|
| 4,811,657 A | 3/1989 | Rixen |
| 4,825,758 A | 5/1989 | Snowball et al. |
| 5,033,273 A | 7/1991 | Buchser et al. |
| 5,060,558 A | 10/1991 | Beumer et al. |
| 5,133,247 A | 7/1992 | Pastrick |
| 5,231,918 A | 8/1993 | Grzywna |
| 5,239,914 A | 8/1993 | Salomon et al. |
| RE34,473 E | 12/1993 | Ryan et al. |
| 5,269,154 A | 12/1993 | Schmidt |
| 5,463,932 A | 11/1995 | Olsen |
| 5,483,932 A | 11/1995 | Olsen |
| D365,579 S | 12/1995 | Baker et al. |
| 5,474,213 A | 12/1995 | Umger |
| D367,659 S | 3/1996 | Baker et al. |
| 5,560,284 A | 10/1996 | Weldman et al. |
| D377,290 S | 1/1997 | Saltet |
| 5,611,262 A | 3/1997 | Rizzulo et al. |
| 5,649,471 A | 7/1997 | Heynderickx et al. |
| 5,687,636 A | 11/1997 | Diore et al. |
| 5,791,523 A | 8/1998 | Oh |
| 5,849,471 A | 12/1998 | Haga |
| 5,857,596 A | 1/1999 | Lee |
| D407,262 S | 3/1999 | Dingelstad |
| 5,881,930 A | 3/1999 | Lee |
| D407,593 S | 4/1999 | Hu et al. |
| D408,208 S | 4/1999 | Hsu |
| 5,957,036 A | 9/1999 | Warner et al. |
| 5,964,143 A | 10/1999 | Driscoll et al. |
| 5,970,849 A | 10/1999 | Baumann et al. |
| 5,984,143 A | 11/1999 | Pettis et al. |
| D417,358 S | 12/1999 | Dutruel |
| 6,003,734 A | 12/1999 | Oh |
| 6,009,792 A | 1/2000 | Kraan |
| 6,009,793 A | 1/2000 | Blankenship et al. |
| D419,821 S | 2/2000 | Powell et al. |
| 6,101,924 A | 8/2000 | Blankenship et al. |
| 6,118,933 A | 9/2000 | Roberson |
| D432,850 S | 10/2000 | Saltet |
| 6,135,173 A | 10/2000 | Lee et al. |
| 6,164,191 A | 12/2000 | Liu et al. |

FIG. 7

HOT BEVERAGE MAKER WITH CUP-ACTUATED DISPENSER

This application is a continuation of U.S. application Ser. No. 11/466,868, filed Aug. 24, 2006 now abandoned; which is a continuation-in-part of U.S. application Ser. No. 10/838,307, filed May 4, 2004 now U.S. Pat. No. 7,543,528; which is a continuation of U.S. application Ser. No. 10/720,769, filed Nov. 24, 2003 now U.S. Pat. No. 7,461,586; which is a continuation-in-part of U.S. application Ser. No. 10/403,438, filed Mar. 31, 2003 now U.S. Pat. No. 6,681,960; which is a continuation of U.S. application Ser. No. 10/011,759, filed Dec. 11, 2001 now U.S. Pat. No. 6,564,975. Each of these applications/patents are incorporated by reference herein.

FIELD OF THE DISCLOSURE

This disclosure relates to a convenient hot beverage maker having a cup-actuated dispenser thereby allowing a user to dispense any amount of beverage desired.

BACKGROUND OF THE INVENTION

Many types and styles of hot beverage makers, especially coffee makers, are known and have been sold for many years. The standard components in these coffee makers include a stand or tower that has a warming plate on the bottom and a filter basket at the top. The coffee maker further includes a carafe that rests on the warming plate and below the filter basket in order to receive brewed liquid from the filter basket.

A problem with traditional coffee makers is the mess that results from using the coffee maker. A user must clean both the carafe and filter basket after each use. Further, if there is no automatic pause and serve feature, then a user must wait for an entire batch to run before removing the carafe to pour a cup of coffee. Even after the batch is run, there may be additional drips that would spill onto the hot warming plate once a carafe is removed for pouring. A warming plate may become dirty with overflow or excess dripage, thereby causing an unappealing aroma.

Also, the use of a carafe is an extra step in the coffee making process. It is another component to place in a dishwasher or fill storage space. While a carafe is likely desirable if a user is pouring numerous cups, it typically takes two hands to pour a single cup of coffee—one hand for the cup and one hand for the carafe. Also, it is possible to cause a splash or spillage simply in the removal or reinserting process of the carafe into and out of the coffee maker stand.

SUMMARY OF THE INVENTION

Accordingly, the present disclosure overcomes the foregoing drawbacks and provides a hot beverage maker having a cup-actuated dispenser. This way, a carafe becomes unnecessary. Also, a user can easily dispense only as much coffee into a cup or mug as the user desires by using a single hand. The clean up process is simplified. All of the potential issues and problems related to using a carafe disappear.

In one embodiment, a hot beverage maker comprises a stand, a fresh water chamber, a brewed beverage tank, and actuator means for dispensing a brewed beverage. The tank comprises a filter basket, a reservoir portion, and an outlet port. The reservoir portion is adapted to hold a brewed liquid. The brewed beverage tank is removable from the stand. Also, the fresh water chamber may comprise transparent walls that allow the user to observe the fresh water level in the chamber. Also, alternatively, the brewed beverage tank may comprise a transparent window to allow a user to observe the brewed beverage level in the tank.

DETAILED DESCRIPTION

FIGS. 1 through 7 illustrate one or more embodiments of a hot beverage maker as disclosed herein. Naturally, a design engineer having ordinary skill with the assembly of coffee makers will be able to create a coffee maker that incorporates the teachings of the present invention, but which may look different and incorporate different, alternative parts. It is the cup-actuated dispenser that makes the unit very convenient and very different from existing coffee makers that include, for instance, a carafe and other components unnecessary in the present invention.

Figure 1:
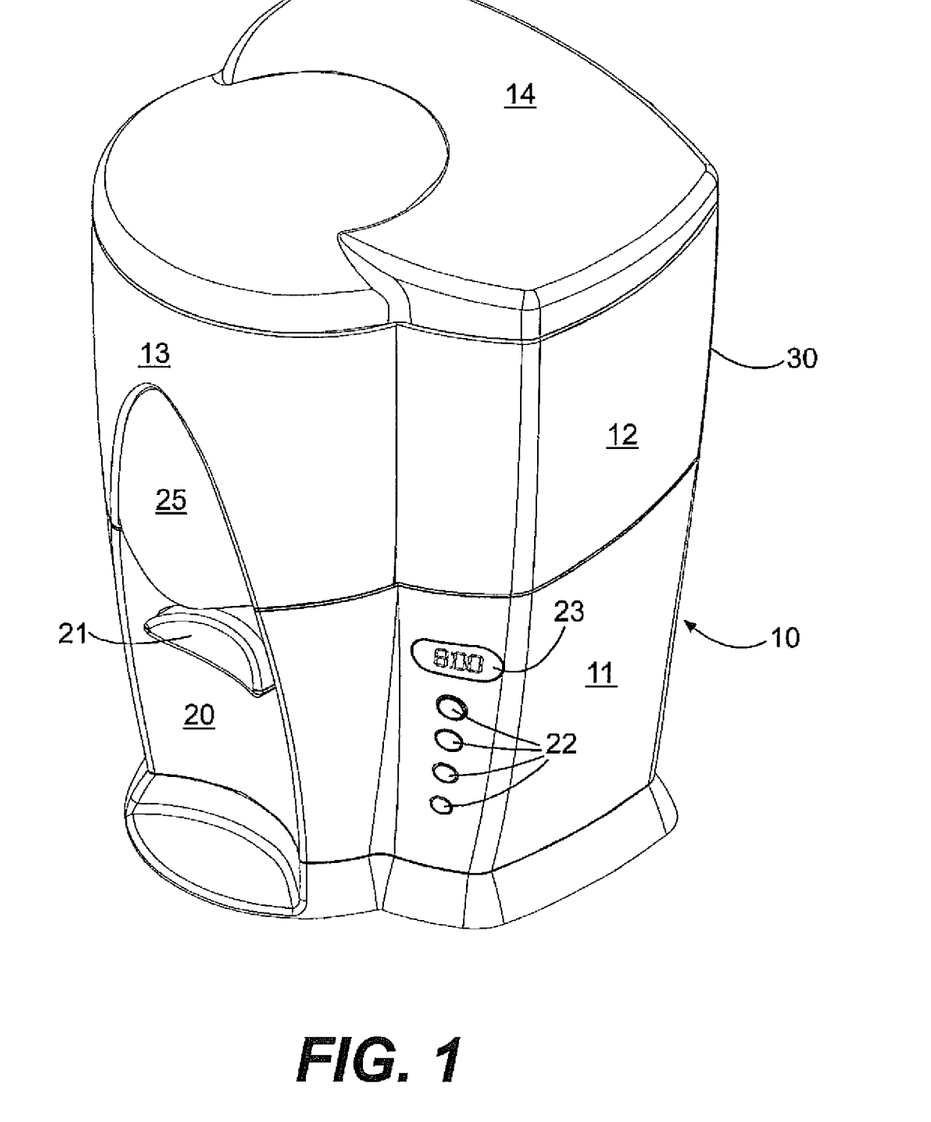
FIG. 1 is a perspective view of a one embodiment of a coffee maker in accordance with the present disclosure.

Turning now to FIG. 1, there is shown a coffee maker 10 that is made up of a stand 11, fresh water reservoir 12, brewed beverage tank 13, and a lid 14. The stand 11 forms the base of coffee maker 10 and supports the reservoir 12 and tank 13. The stand 11 includes a recess 20 in which is situated a push-button 21. Adjacent to recess 20 are the electrical switches 22 that operate the coffee maker 10 and allow the user to, for instance, program a start time or set the time of the clock 23. Of course, these electrical switches 22 may be analog or digital. Fewer or more controls may be applicable for a given model of coffee maker.

The fresh water reservoir 12 has transparent sidewalls 30. The transparent sidewalls 30 allow users to easily and immediately determine whether and how much fresh water is in the coffee maker 10. Of course, nontransparent walls may be used, or a vertical window slot could be used. A water level indicator may also facilitate the ability of a user to accurately gauge the water volume.

The fresh water reservoir 12 rests on the stand 11. The fresh water reservoir 12 wraps partially around the brewed beverage tank 13. The brewed beverage tank 13 also rests on the stand 11. The brewed beverage tank 13 has a transparent window 25 which allows a user to observe very easily and quickly how much brewed beverage is contained within the tank 13. Finally, a lid 14 is rotatably connected to back wall of the reservoir 12. The lid 14 is adapted to cover both the fresh water reservoir 12 and the brewed beverage tank 13.

Figure 2:
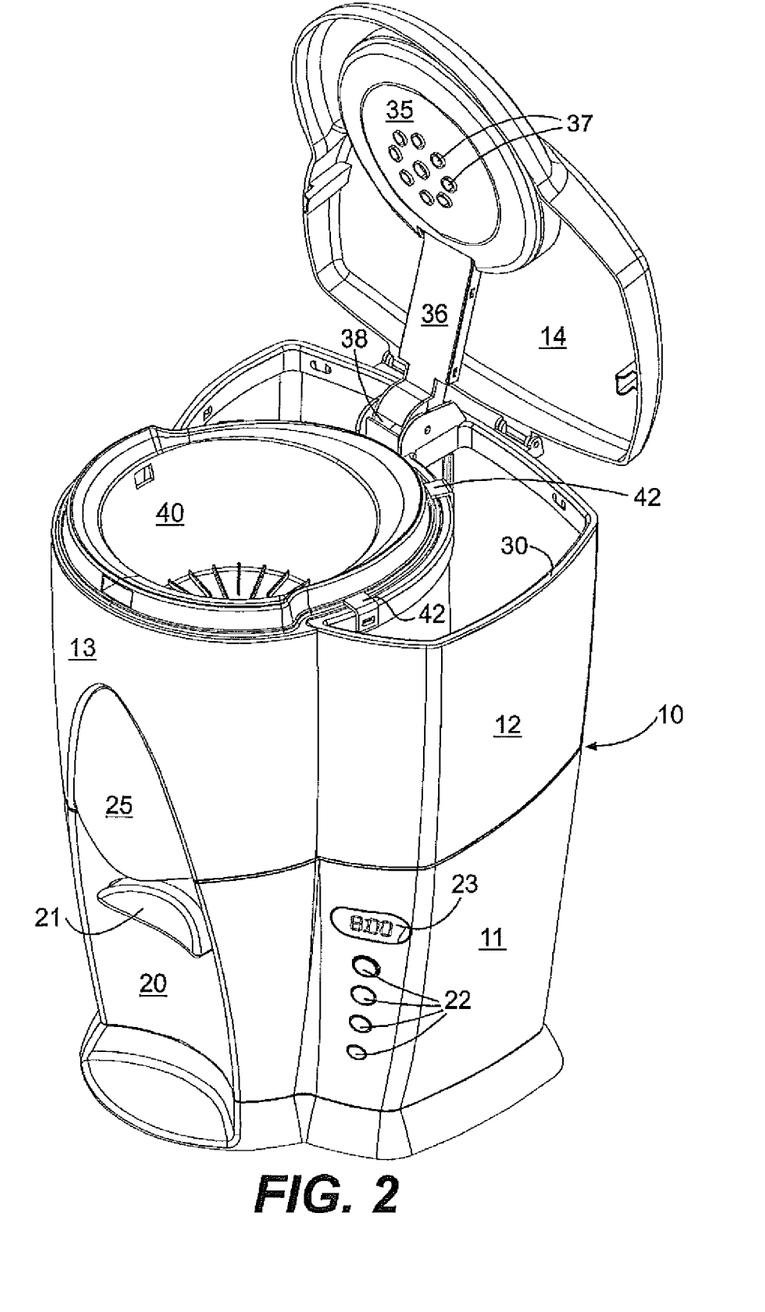
FIG. 2 is a perspective view of the coffee maker shown in FIG. 1 with the lid in the open position.

FIG. 2 is similar to FIG. 1 except that the lid 14 is rotated up to the open position in FIG. 2. With the lid 14 open, there can be seen a removable filter basket 40 that is mountable with the brewed beverage tank 13. The showerhead 35 is connected to the lid 14 and rotates up and down with the lid.

Figure 4:
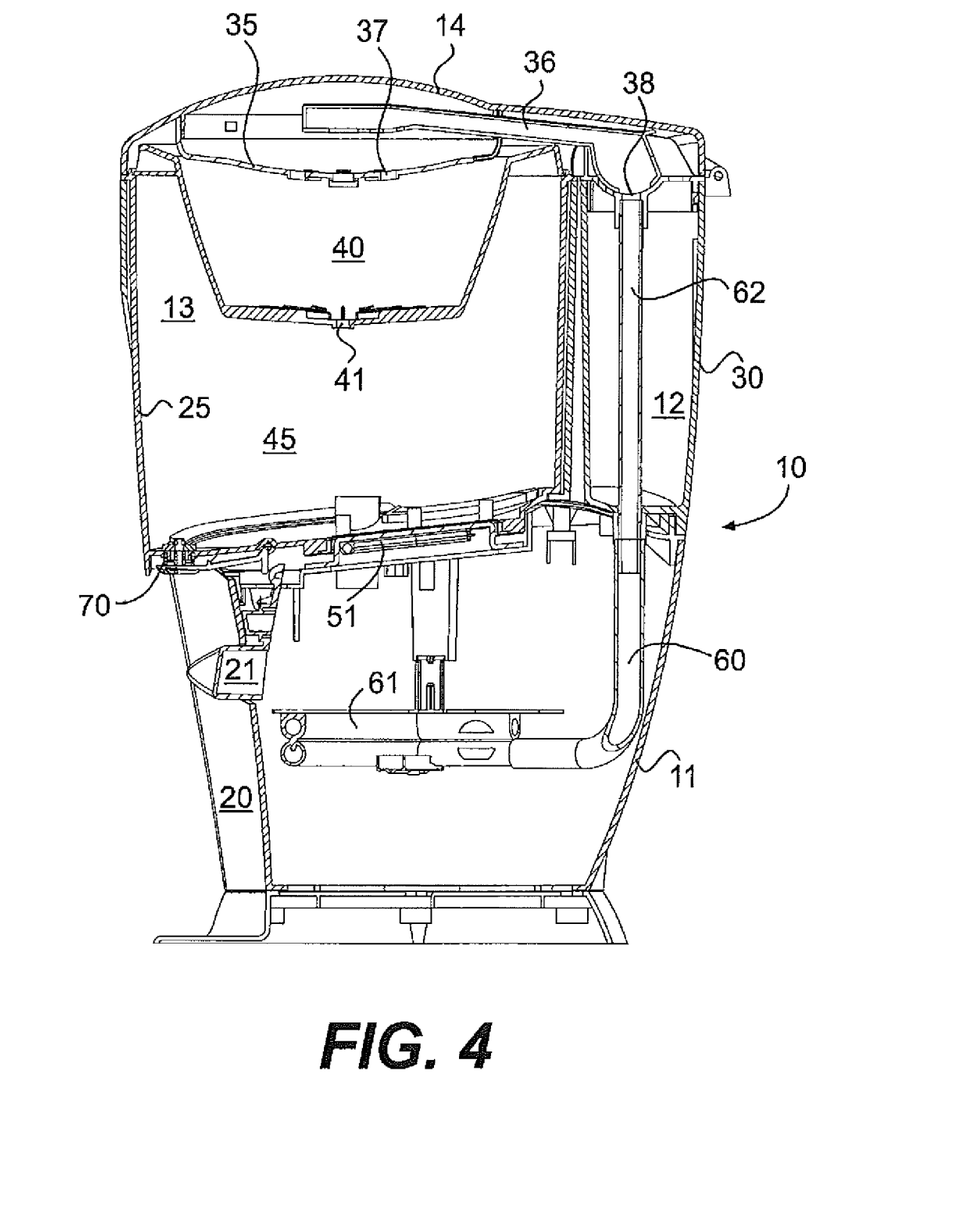
FIG. 4 is a side elevation, cross sectional view of the coffee maker shown in FIG. 1.

Support arm 36 is a channel connecting the showerhead 35 to the hot water tube shown in FIG. 4.

Figure 3:
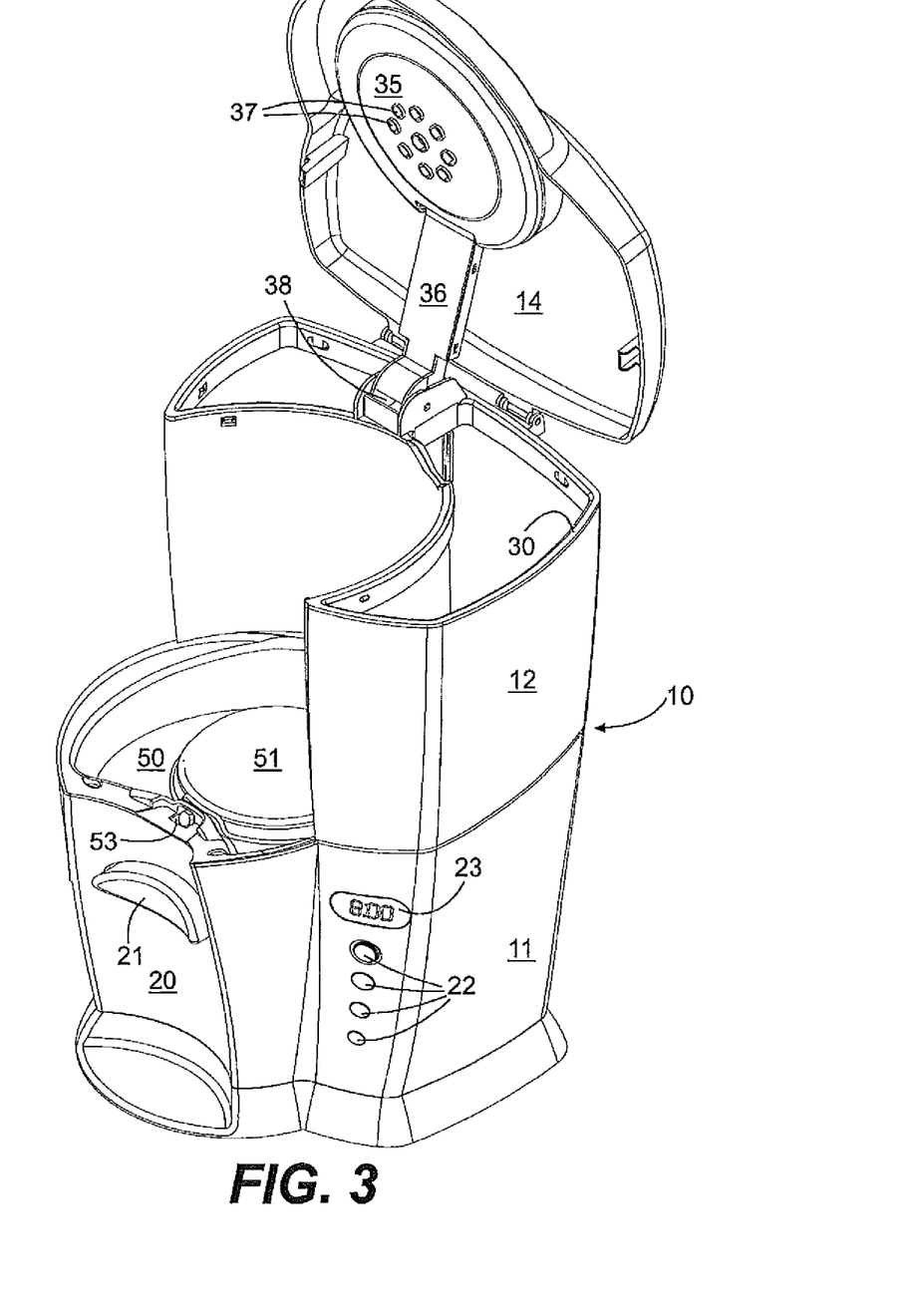
FIG. 3 is a perspective view of the coffee maker shown in FIGS. 1 and 2 with the brew tank removed and with the lid in the open position.

FIG. 3 is a still further view of the coffee maker 10 wherein the brewed beverage tank has been removed. The stand 11 includes a platform 50 which is adapted to support the brewed beverage tank shown in the other figures. The apertures 37 on the bottom of the showerhead 35 allow for the even distribution of water into the filter basket when the showerhead/lid is in the down position. The end of the arm portion 36 of the showerhead 35 includes an aperture 38. When the lid 14 is rotated open, the aperture 38 rotates around and diverts the flow of hot water back into the fresh water reservoir 12.

The platform 50 includes a warmer plate 51 which is adapted to engage the bottom of the brewed beverage tank to keep a brewed beverage inside the tank warm. The platform 50 is molded in part into a recess that is adapted to receive in a mating fashion the molded male portion 110 (see FIG. 7) of the bottom of a brew tank. In this mating relationship, the tank is properly aligned and retained in position in the stand 11. Referring briefly back to FIG. 2, hooks 42 engage the top of the fresh water tank walls 30 to work with the male portion 110 to properly position the tank 13 on the stand 11. Finally, the platform 50 includes an aperture 53 from which protrudes a lever that makes up part of the dispenser actuator. (See FIGS. 4-6).

FIG. 4 is a cross sectional view of the coffee maker 10 that provides a view of the operational components of the coffee maker. The portions of the coffee maker 10 not previously shown include the water tube 60 which carries heated water from the hot water heater element 61 up to the pipe 62 and then showerhead 35 via the arm 36. The top of the pipe 62 is hingeably connected to the end of the arm 36. The arm 36 includes an aperture 38 which is aligned with an opening to the pipe 62 when the showerhead 35 and lid 14 are in the down position as shown. However, when the showerhead 35/lid 14 are swiveled upwardly, the aperture 38 is rotated around and hot water is rerouted back into the fresh water reservoir 12 to prevent any water flow out of the showerhead when it is in the up position. Although not shown, there is a further tube that is adjacent to the tube 60 that carries the fresh cold water from the fresh water reservoir 12 through the heater coil 61 to the hot water pipe 62 as shown.

The brewed beverage tank 13 is made up of the filter basket 40 that has an aperture 41 at the bottom of the filter basket to allow the infused water to drip into the reservoir portion 45 of the brewed beverage tank 13. An outlet port 70 is the aperture through which the brewed beverage may be allowed to exit the brewed beverage tank 13. The filter basket 40 is conventional in structure and dimension in order to be easily usable. As is also evident from FIG. 4, the bottom of the reservoir portion 45 slopes generally from the back of the coffeemaker (i.e., the fresh water reservoir 12) to the front where the port 70 is fixed. This configuration allows full drainage out of the bottom towards the front of the tank 13 where a user's cup may be easily placed for dispensing.

Figure 5:
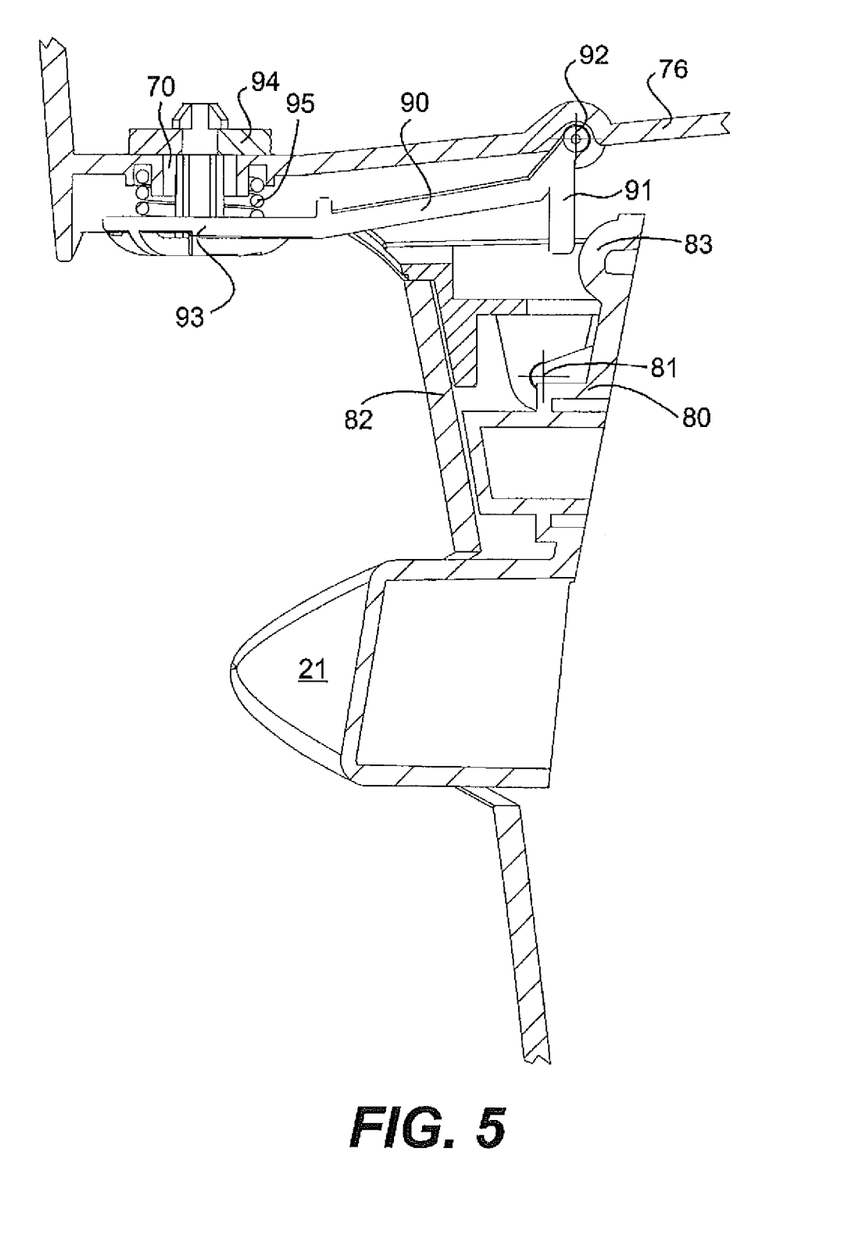
FIGS. 5 and 6 are side elevation cross sectional views detailing one embodiment of the dispenser actuator mechanism in accordance with one embodiment of the present disclosure.
Figure 6:
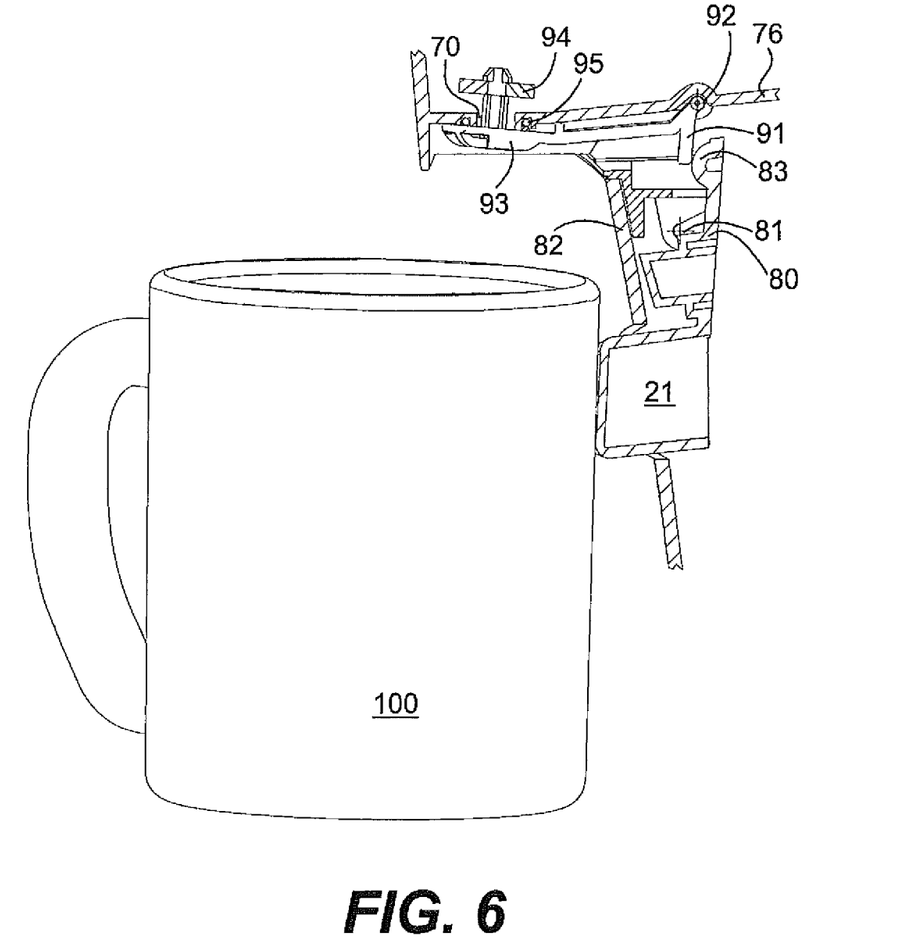

Turning now to FIGS. 5 and 6, there is shown one embodiment of a dispenser actuator mechanism in accordance with the present invention. FIGS. 5 and 6 demonstrate the mechanism in the biased closed position (FIG. 5) and in the open position as when a cup 100 is pressing against the push button 21 (FIG. 6).

Push button 21 is connected to one end of lever 80. Lever 80 has a pivot point 81 that is a hinge mounted behind the front face 82 of the stand 11. The opposite end 83 of the lever 80 protrudes through aperture 53 (see FIG. 3) that makes up a portion of the platform 50 of the stand 11. A second lever 90 is mounted onto the bottom 76 of the brew tank 13. The lever 90 has a first end 91 and a second end 93 that are on opposite ends with a pivot 92 mounted on the bottom portion 76. Further, a spring 95 biases the first end 91 of the lever 90 downwardly so that the second end 93 is biased in a downward position. Plug 94 is adapted to seal the outlet port 70 of the brew tank 13. The plug 94 is connected to second end 93 and is urged upwardly or downwardly based on the movement of the second end 93 of the second lever 90. In the closed position shown in FIG. 5, the spring 95 urges the first end 91 downwardly so that the second end 93 is urged downwardly. Accordingly, the plug 94 is securely sealed to the outlet port 70. Alternatively, as demonstrated in FIG. 6, end 83 of the first lever 80 urges the first end 91 of the second lever 90 against the bias of the spring 95. This moves the second end 93 of the second lever 90 upwardly to thereby open the outlet port 70 and allow brewed beverage to flow out of the brew tank 13.

While the "two-piece" actuator illustrated in FIGS. 4, 5 and 6 is one type of cup-actuated dispensing means, there are, of course, alternative types of dispenser actuators. There are numerous types of electronic dispensers that are well known in the refrigerator door ice and dispensers. Similarly, other types of mechanical dispensers may be designed to accommodate the specific engineering needs of a given coffee maker structure.

Figure 7:
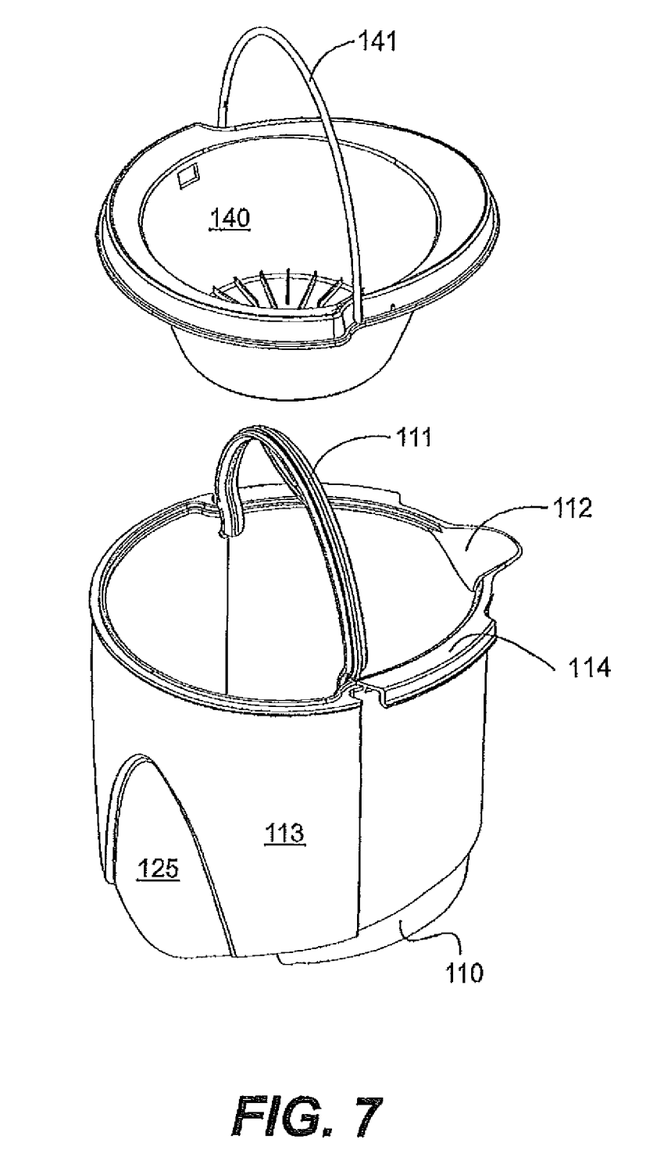
FIG. 7 is a perspective view of another embodiment of a brew tank and filter basket as disclosed herein.

FIG. 7 displays further embodiments of the brew tank 113 and filter basket 140. The filter basket 140 is different from the earlier described filter basket 40 in that it includes a handle 141 for making removal very simple. Similarly, the alternative brew tank 113 includes a handle 111 to facilitate handling. The brew tank 113 also has a transparent window 125 allowing a user to observe the brewed beverage volume inside. A spout 112 improves the use of the brew tank as a fresh water bucket to transfer fresh water from a sink or other source and pour it into the fresh water reservoir 12. Finally, lip 114 is merely a design variation of the hooks 140 which allow the brew tank 113 to engage the top of the fresh water reservoir walls 30 to secure the brew tank 113 in place once it is mounted on the platform 50. The male portion 110 is the molded piece of the bottom of the brew tank 113 which is received in the platform 50.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A hot beverage maker comprising:
a stand with a fresh water reservoir fresh water reservoir positioned on the stand a lid attached to the stand, the lid having a first position where the lid substantially covers the fresh water reservoir and a second position where the fresh water reservoir is accessible to a user, the stand further comprising a platform with a warmer plate;
a brewed beverage tank with a sidewall and a bottom, the brewed beverage tank being removably mounted on the platform, the bottom of the brewed beverage tank engaged to the warmer plate, the brewed beverage tank comprising a fluid bucket when the brewed beverage tank is removed from the stand, the sidewall of the brewed beverage tank includes a window and the user observes the amount of brewed beverage contained within the brewed beverage tank via the window;
a water heater fluidily connected to the fresh water reservoir;
a hot water tube extending from and in fluid connection with the water heater;

a filter basket including a drain aperture wherein fluid exits the filter basket via the drain aperture and enters the brewed beverage tank;

an actuator;

an outlet port, the outlet port fluidily connected to a reservoir portion of the brewed beverage tank, the actuator engaged by the user to thereby dispense brewed beverage from the brewed beverage tank; and wherein the warmer plate engages a heat conducting bottom surface of the brewed beverage tank when the brewed beverage tank is positioned on the platform to keep the brewed beverage in the brewed beverage tank warm.

2. The hot beverage maker of claim 1, wherein the user engages the actuator by pressing a mug against the actuator, the outlet port positioned to dispense the brewed beverage from the brewed beverage tank into the mug.

3. The hot beverage maker of claim 1, wherein the bottom of the brewed beverage tank includes a molded male portion.

4. The hot beverage maker of claim 3, wherein the molded male portion of the brewed beverage tank extends beyond a bottom surface of the bottom of the brewed beverage tank.

5. The hot beverage maker of claim 3, wherein the warmer plate extends above the surface of the platform and the molded male portion of the brewed beverage tank is positioned around the warmer plate.

6. The hot beverage maker of claim 3, wherein the platform is molded to receive in a mating relationship the molded male portion of the brewed beverage tank.

7. The hot beverage maker of claim 6, wherein the mating relationship between the platform and the molded male portion of the brewed beverage tank aligns and retains the brewed beverage tank on the stand.

8. The hot beverage maker of claim 2, further comprising a recess that at least partially receives the mug.

9. A hot beverage maker comprising:

a stand;

a volume of fresh water;

a platform with a warmer plate, the warmer plate extending above an upper surface of the platform;

a brewed beverage tank with a sidewall and a bottom, the brewed beverage tank being removably mounted on the platform in contact with the warmer plate, the brewed beverage tank further comprising a window in the sidewall, the brewed beverage tank comprising a fluid bucket when the brewed beverage tank is removed from the stand;

a fluid flow path from the fresh water reservoir to the brewed beverage tank, the fluid flow path including a water heater;

an actuator; and an outlet port, the outlet port fluidily connected to a reservoir portion of the brewed beverage tank, the actuator engaged by the user to thereby dispense brewed beverage from the brewed beverage tank.

10. The hot beverage maker of claim 9, wherein the user engages the actuator by pressing a mug against the actuator.

11. The hot beverage maker of claim 10, further comprising a recess that at least partially receives the mug so that the mug may actuate the actuator.

\* \* \* \* \*